US009554591B2

(12) United States Patent
Marangoni et al.

(10) Patent No.: US 9,554,591 B2
(45) Date of Patent: Jan. 31, 2017

(54) NUT BUTTER COMPOSITIONS

(71) Applicant: The J.M. Smucker Company, Orrville, OH (US)

(72) Inventors: Alejandro G. Marangoni, Guelph (CA); Luis Fernando Reyes Mora (Reyes), Massillon, OH (US)

(73) Assignee: The J.M. Smucker Company, Orrville, OH (US)

( * ) Notice: Subject to any disclaimer, the term of this patent is extended or adjusted under 35 U.S.C. 154(b) by 0 days.

(21) Appl. No.: 14/700,457

(22) Filed: Apr. 30, 2015

(65) Prior Publication Data

US 2016/0316796 A1 Nov. 3, 2016

(51) Int. Cl.
*A23L 1/36* (2006.01)
*A23L 1/38* (2006.01)

(52) U.S. Cl.
CPC .............. *A23L 1/38* (2013.01); *A23V 2002/00* (2013.01)

(58) Field of Classification Search
CPC ......... A23L 1/38; A23D 9/00; A23V 2002/00; A23G 2200/08; C11C 1/00
USPC .......................... 426/633, 634, 601, 606, 607
See application file for complete search history.

(56) References Cited

U.S. PATENT DOCUMENTS

| | | | |
|---|---|---|---|
| 2,255,032 A * | 9/1941 | Weisgurt | A23D 9/007 426/633 |
| 2,278,141 A | 3/1942 | Warth | |
| 2,622,017 A | 12/1952 | Bramhall et al. | |
| 4,839,184 A | 6/1989 | Cherukuri et al. | |
| 5,160,759 A | 11/1992 | Nomura et al. | |
| 6,461,654 B1 | 10/2002 | Cain et al. | |
| 6,582,748 B1 | 6/2003 | Loh et al. | |
| 7,157,110 B2 | 1/2007 | Loh et al. | |
| 7,691,428 B2 | 4/2010 | Skogerson et al. | |
| 8,080,275 B2 | 12/2011 | Ringhouse et al. | |
| 8,227,011 B2 | 7/2012 | Loh et al. | |
| 2004/0052921 A1 | 3/2004 | Loh et al. | |
| 2005/0214436 A1 | 9/2005 | Doucet | |
| 2006/0105092 A1 | 5/2006 | Miller | |
| 2007/0190186 A1 | 8/2007 | Loh et al. | |
| 2009/0017181 A1 | 1/2009 | Doucet | |
| 2009/0220653 A1 | 9/2009 | Doucet | |
| 2011/0281014 A1 | 11/2011 | Higgins | |
| 2011/0281015 A1 | 11/2011 | Higgins et al. | |
| 2012/0121786 A1 | 5/2012 | Higgins et al. | |

OTHER PUBLICATIONS

Ribus, Nu-Bake-RIBUS, The Makers of Specialty Ingredients, pp. 1-9, Oct. 13, 2016 (http://ribus.com/nu-bake/.*
A. Blake & A. Marangoni, A Comparative Study of Waxes as Oil-Binding Materials, 2012 AOCS Meeting, http://www.aocs.org/Meetings/content.cfm?ItemNumber=18752, University of Guelph, Guelph, Ontario, Canada.
Wax Basics—Overview; The International Group, Inc.; http://www.igiwax.com/reference/waxbasics.html; accessed Mar. 24, 2016.

* cited by examiner

*Primary Examiner* — Helen F Heggestad
(74) *Attorney, Agent, or Firm* — Michael A. Olshavsky

(57) ABSTRACT

Provided herein are butter compositions, which include a legume butter or nut butter or seed butter and a plant-derived wax that increases the hardness of the butter compositions and reduces the separation of oil from the butter during storage. Butter compositions incorporating such plant-derived waxes and methods of manufacturing these butter compositions are also disclosed.

15 Claims, 3 Drawing Sheets

NUT BUTTER COMPOSITIONS

TECHNICAL FIELD

The invention generally relates to peanut and nut butter compositions and methods of manufacture. More particularly, the invention relates to peanut and nut butter compositions that include a stabilizer to prevent the separation of oil in the nut butters.

BACKGROUND OF THE INVENTION

Nut butters are typically prepared by roasting and blanching raw nuts and then grinding them. The resulting product is a pasty material, which is a mixture of nut particles and oil that is released from the cellular structure of the nuts during the grinding operation. If this product is allowed to stand for a period of time, then the oil tends to separate from the product and form separate layer on the top leaving a solid mass of ground nut particles underneath.

In order to prevent this oil separation, stabilizers or stabilizing agents such as mono- and diglycerides, often consisting of high melting point fats and oils such as partially or completely hydrogenated fats or oils, can be included in the nut butter preparations. Examples of oils from which such stabilizers are made include rapeseed, cottonseed, and soybean oils. It is known that certain stabilizers form a crystalline structure when cooled, and that such crystalline structures assist in preventing the oil from separating from the ground nut particles.

Customers are increasingly paying closer attention to their health and to the particulars regarding their food sources. As such, consumers are questioning their consumption of products which contain partially or completely hydrogenated fats or oils because it is known that these partially or completely hydrogenated fats or oils contain high amounts of trans-fat (also known as a trans-fatty acid) and many doctors consider trans-fat to be the worst type of fat that can be consumed. Unlike other dietary fats, trans-fat raises both the low density lipoprotein (LDL), also known as "bad" cholesterol, and lowers the high density lipoprotein (HDL) also known as "good" cholesterol. Furthermore, studies have shown that the combination of high LDL cholesterol and low HDL cholesterol can increase the risk of heart disease in both men and women.

Accordingly, it would be desirable to provide a stabilized butter composition that has improved or longer-term storage stability including reduced oil separation.

In general, one aspect of the invention is to provide a butter composition. The butter composition comprises at least one type of a roasted and ground nut, seed or legume, and a stabilizer, wherein the stabilizer is a plant-derived wax.

In yet another aspect of the invention, a method of preparing a stabilized butter composition is provided. The method comprises the steps of roasting at least one variety of a nut, seed or legume, grinding the at least one variety of nut, seed or legume to form a nut paste, seed paste or legume paste, heating a plant-derived wax stabilizer above its melting point to form a pourable stabilizer, mixing the pourable stabilizer with the nut paste, seed paste or legume paste to form a mixture, and cooling the mixture to form the stabilized butter composition.

In still yet another aspect of the invention, a butter stabilizer composition is provided. The nut stabilizer composition comprises a plant-derived wax baying an ester content in the range from about 78%-100% and a melting point in the range from about 74° C.-82° C.

Figure 1:
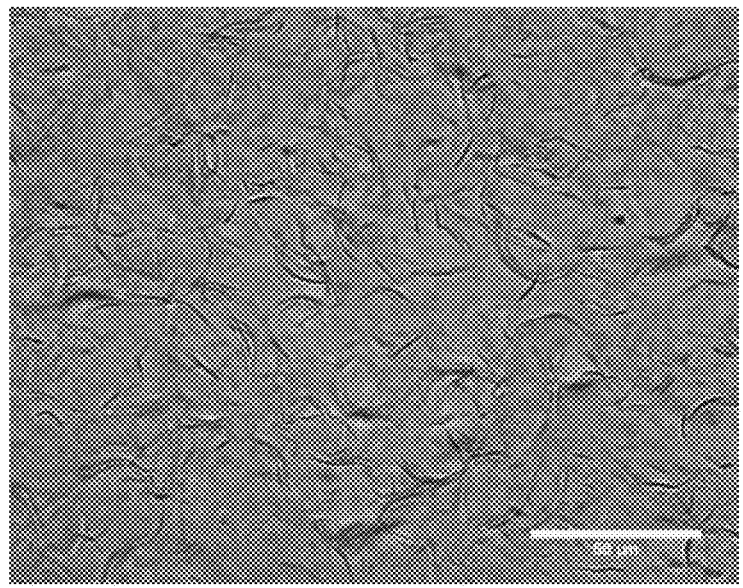
FIG. 1 is an optical light microphotograph of a wax crystal network of rice bran wax.

The present invention will be described in connection with a preferred embodiment, however, it will be understood that there is no intent to limit the invention to the embodiment described. On the contrary, the intent is to cover all alternatives, modifications, and equivalents as may be included within the spirit and scope of the invention as defined by the appended claims.

DETAILED DESCRIPTION OF THE INVENTION

Unless otherwise defined, all technical and scientific terms used herein have the same meaning as is commonly understood by one of ordinary skill in the art to which this invention belongs. The terminology used in the description of the invention herein is for describing particular embodiments only and is not intended to be limiting of the invention. As used in the description of the invention and the appended claims, the singular forms "a," "an," and "the" are intended to include the plural forms as well, unless the context clearly indicates otherwise.

Unless otherwise indicated, all numbers expressing quantities of ingredients, properties such as weight percent, reaction conditions, and so forth as used in the specification and claims are to be understood as being modified in all instances by the term "about." Accordingly, unless otherwise indicated, the numerical properties set forth in the following specification and claims are approximations that may vary depending on the desired properties sought to be obtained in embodiments of the present invention. Notwithstanding that the numerical ranges and parameters setting forth the broad scope of the invention are approximations, the numerical values set forth in the specific examples are reported with relative precision. Any numerical values, however, may inherently contain certain errors necessarily resulting from error found in their respective measurements. As used herein, all percentages (%) are by weight, unless otherwise indicated.

As used herein, the term "butter" means a spreadable food product comprising a mixture of ground legumes, ground nuts, ground seeds, or mixtures thereof and fat/oil, plus other optional ingredients such as, but not limited to, thickening agents, flavorants, flavor enhancers, wax, and mixtures thereof. Additionally, embodiments of the invention will fall under the categorization of either "peanut butter" or "peanut spread" as defined by the standards of identity of the U.S. Food and Drug Administration under 21 C.F.R 164.150 and 21 C.F.R 102.23.

While the embodiments of the invention will be generally described in terms of peanuts and peanut butter, it should be readily apparent that other legume butters or nut butters or seed butters are considered within the scope of the embodiments of the invention. In general, the at least one type of ground legumes, ground nuts or ground seeds are selected from the group consisting of peanuts, almonds, pecans, walnuts, cashews, macadamia nuts, hazelnuts, Brazilian nuts, sunflower seeds, sesame seeds, pumpkin seeds, and mixtures thereof. In one embodiment, the butter composition comprises about 95.0-99.8 wt. % of the at least one type of ground legumes, ground nuts or ground seeds. Representative nut butters include, but are not limited to, unstabilized Laura Scudder's® All Natural Peanut Butter and unstabilized Jif® Peanut Butter.

In another embodiment of the invention, the butter comprises an unstabilized mixture of fine ground peanuts that includes roasted and ground peanuts and has a fineness of grind in the range from about 4.0 mils-5.5 mils (1 mil=25.4 µm). In an alternate embodiment, the butter comprises an unstabilized mixture of coarse ground peanuts that includes roasted and ground peanuts and less than 1.0% by weight salt and has a fineness of grind in the range from about 13.0 mils-17.0 mils.

A further embodiment of the invention is the inclusion of a stabilizer, which includes a plant-derived wax, in the butter composition. The stabilizer is selected from the group consisting of rice bran wax, sugarcane wax, sunflower wax, candelilia wax and double distilled candelilla wax. In one embodiment, the butter composition comprises about 0.2-5.0 wt. % of a plant-derived wax.

The representative chemical composition of various plant-derived waxes considered in at least one embodiment of the invention is provided in Table 1 below:

TABLE 1[1]

| Material Wt. % | Rice Bran Wax | Sunflower Wax | Candelilla Wax | Carnauba Wax | Sugar Cane Wax |
|---|---|---|---|---|---|
| Ester Content | 92-97 | 97-100 | 27-35 | 84-85 | 78-82 |
| Free Fatty Acid | 0-2 | 0-1 | 7-10 | 3-3.5 | 7-15 |
| Free Fatty Alcohol | 0 | 0 | 10-15 | 2-3 | 0 |
| Hydrocarbons | 0 | 0 | 50-65 | 1.5-3 | 3-9 |
| Resins | 3-8 | 0-3 | 0-3 | 0 | 6.5-10 |
| Melting point (° C.) | 78-82 | 74-77 | 60-73 | 80-85 | 75-82 |

[1]Blake, A. I., Co, E. D., and Marangoni, A. G., (2014). Structure and Physical Properties of Plant Wax Crystal Networks and Their Relationship to Oil Binding Capacity. J. Am. Oil Chem. Soc., Vol. 91, Issue 6, pp. 885-903.

The hydrocarbon amounts listed in Table 1 are long chain aliphatic hydrocarbons including $C_{29}$-$C_{33}$ hydrocarbons for candelilla wax, $C_{29}$-$C_{33}$ for carnauba wax, and $C_{29}$-$C_{33}$ for sugar cane wax. The resin amounts listed in Table 1 are naturally occurring resins composed mainly of volatile fluid terpenes, with lesser components of dissolved non-volatile solids which make resin thick and sticky.

Figure 2:
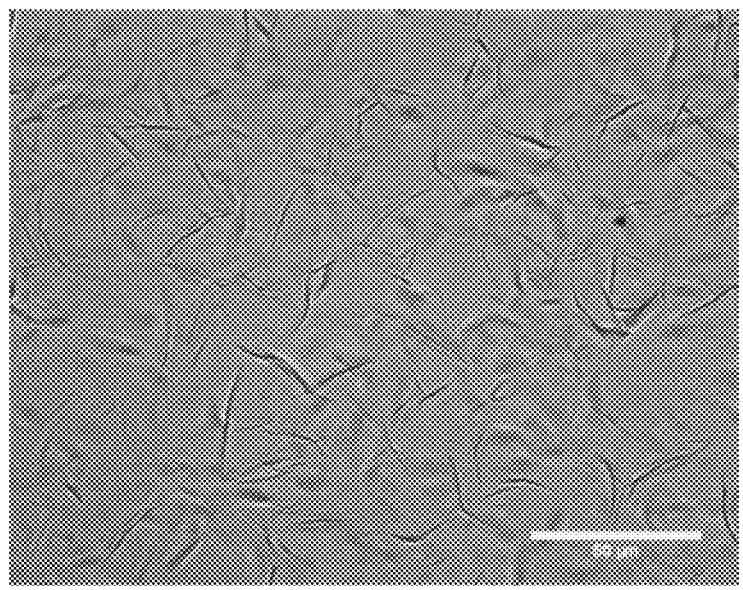
FIG. 2 is an optical light microphotograph of a wax crystal network of sunflower wax.
Figure 3:
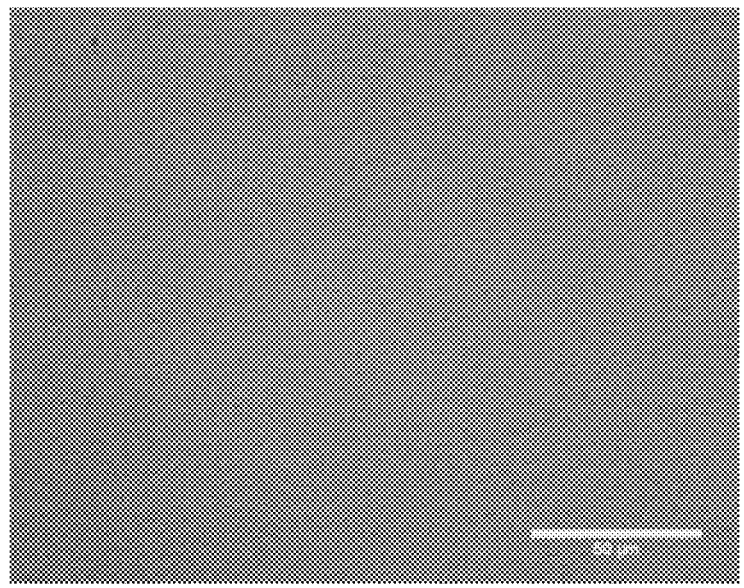
FIG. 3 is an optical light microphotograph of a wax crystal network of candelilla wax.

Without intending to be bound by theory, it is believed that the plant-derived wax creates a wax crystal network within the butter composition and that this crystal network interacts with the oil present in the legume butters, nut butters, and seed butters. It is also possible that, due to effects of surface tension, this interaction occurs to a large extent within the pores and capillaries of the wax crystal network and, as a result of van der Waals forces, the oil adsorbs and adheres to the surface of the wax crystal network. Representative wax crystal networks for rice bran wax, sugarcane wax, and candelilla wax are shown in the optical light microphotographs in FIGS. 1-3.

Figures 4A, 4B, 4C:
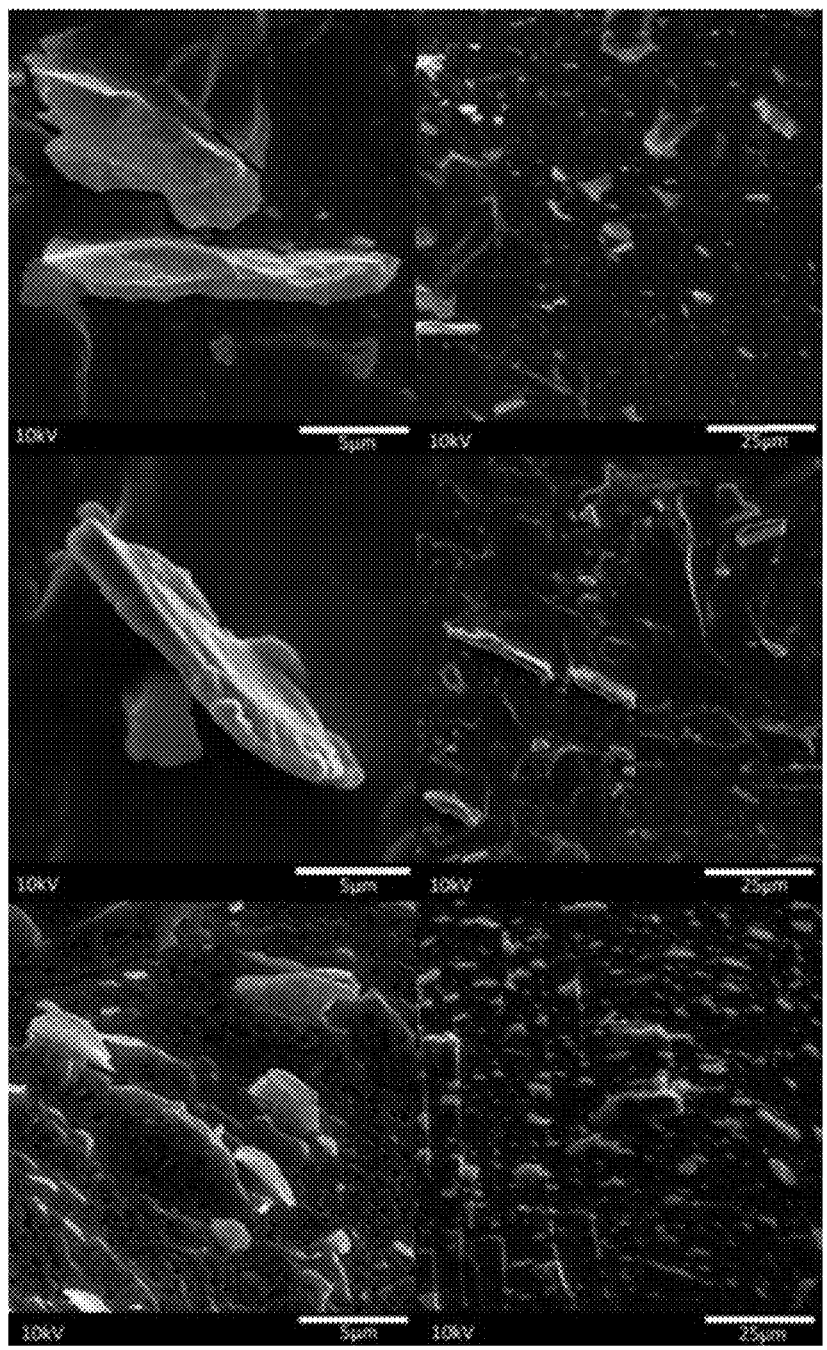
FIG. 4A is an image from a scanning electron microscope of the platelet structure of rice bran wax.
FIG. 4B is an image from a scanning electron microscope of the platelet structure of sunflower wax.
FIG. 4C is an image from a scanning electron microscope of the platelet structure of candelilla wax.

It has surprisingly been found, using scanning electron microscopy (Food Structure, Vol. 3, January 2015, pgs. 30-34), that the wax crystals from rice bran wax, sunflower wax, and candelilla wax actually have the platelet-like morphology as seen in FIGS. 4A-4C.

The needle-like appearance of the waxes seen in optical light microscopy may simply be an artifact of how the samples crystalize on a glass substrate during sample preparation for optical light microscopy imaging. Considering that waxes are hydrophobic, due in part to their high ester content, and that glass surfaces are typically hydrophilic, crystallization of a hydrophobic wax on a hydrophilic glass surface would involve a thermodynamically unfavorable interaction and an increase in entropy, which would drive the Gibb's free energy ($\Delta G$) to above zero. However, if the wax were to crystallize on a platelet edge the interfacial surface area of contact between the hydrophobic wax and hydrophilic glass would be minimized, which would reduce the thermodynamic penalty and the positive $\Delta G$ associated with such an interaction. If such on-edge platelet crystallization occurred in a sample and the sample was subsequently examined under microscope, the protruding edges associated the platelets would be in view and this would give the sample a needle-like appearance.

Platelet length appears comparable to "needle" length measurements obtained from optical light micrographs. As further seen in FIGS. 4A-4C, candelilla wax crystals are smaller and more highly homogenously dispersed compared to rice bran wax and sunflower wax crystals. At lower magnifications, a higher number of candelilla wax crystals are observed in the field of view compared to rice bran wax and sunflower wax, which provides evidence for the high dispersion of candelilla wax crystals. The larger and less homogenously dispersed crystals associated with rice bran wax and sunflower wax may indicate that the oil pores for crystals comprising these particular waxes are larger compared to those present in crystals comprising candelilla wax.

In addition to crystal shape and dispersion, other morphological factors associated with a wax's crystal structure which may also impact its ability to structure oil. For example, the surface area and platelet size associated with the wax crystals are contemplated as important and worth further consideration. Again, without intending to be bound by theory, it is believed that surface area, surface roughness and surface quality may influence the amount of oil that can be bound within the wax crystal network.

Sample Preparation and Analysis

Wax samples ranging from about 100 g to about 500 g, including rice bran wax and double distilled candelilla wax, were compared to a commercial stabilizer; Grindsted® PS 105 K-A, which is a kosher approved blend of edible, refined, fully hydrogenated rapeseed, cottonseed, and soybean oils and available from Danisco DuPont. Each of the wax samples and the commercial stabilizer are placed into separate containers and then melted statically for about 1 hour by being immersed in a water bath set at 95° C. using a heating medium of 50/50 water and glycerol.

The butter composition was prepared by mixing an unstabilized peanut butter (Laura Scudder's® All Natural Peanut Butter and Adams® Natural Peanut Butter are two examples of such unstabilized peanut butters that are commercially available) in a UMC-5 Stephan mixer (IMA industries located in Leominister, Mass.) attached to a water bath set at 99 using a 50/50 mixture of water and glycerol as the heating medium. The unstabilized peanut butter was mixed for approximately one hour at 15% speed setting (about 450

RPM) until the temperature reached an equilibrium. Each of the representative melted waxes and commercial stabilizer were then individually added to separate batches of the heated unstabilized peanut butter and each batch was mixed at the same speed setting for an additional thirty minutes. A set of 4 replicate samples, each sample containing 40 g of the peanut butter-wax-stabilizer mixture, was poured into 50-mL plastic centrifuge tubes and cooled statically in a deep-freezer set at −32° C. for about 15 minutes. The set of samples were then allowed to sit at room temperature for 24 hours.

EXAMPLES

The following examples are intended to illustrate embodiments of the invention, but are not meant to be limiting thereof.

Example 1

| Material | Weight % |
| --- | --- |
| Natural Peanut Butter (Coarse) | 100.0 |
| Wax | 0.0 |

Example 2

| Material | Weight % |
| --- | --- |
| Natural Peanut Butter (Coarse) | 99.0 |
| Commercial Stabilizer | 1.0 |

Example 3

| Material | Weight % |
| --- | --- |
| Natural Peanut Butter (Coarse) | 99.5 |
| Rice Bran Wax | 0.5 |

Example 4

| Material | Weight % |
| --- | --- |
| Natural Peanut Butter (Coarse) | 99.25 |
| Rice Bran Wax | 0.75 |

Example 5

| Material | Weight % |
| --- | --- |
| Natural Peanut Butter (Coarse) | 99.0 |
| Rice Bran Wax | 1.0 |

Example 6

| Material | Weight % |
| --- | --- |
| Natural Peanut Butter (Coarse) | 98.5 |
| Rice Bran Wax | 1.5 |

Example 7

| Material | Weight % |
| --- | --- |
| Natural Peanut Butter (Coarse) | 98.0 |
| Rice Bran Wax | 2.0 |

Example 8

| Material | Weight % |
| --- | --- |
| Natural Peanut Butter (Coarse) | 97.0 |
| Rice Bran Wax | 3.0 |

Example 9

| Material | Weight % |
| --- | --- |
| Natural Peanut Butter (Coarse) | 99.0 |
| Candelilla Wax | 1.0 |

Example 10

| Material | Weight % |
| --- | --- |
| Natural Peanut Butter (Coarse) | 98.0 |
| Candelilla Wax | 2.0 |

Example 11

| Material | Weight % |
| --- | --- |
| Natural Peanut Butter (Coarse) | 97.0 |
| Candelilla Wax | 3.0 |

Example 12

| Material | Weight % |
| --- | --- |
| Natural Peanut Butter (Coarse) | 99.0 |
| Double Distilled Candelilla Wax | 1.0 |

Example 13

| Material | Weight % |
| --- | --- |
| Natural Peanut Butter (Coarse) | 98.0 |
| Double Distilled Candelilla Wax | 2.0 |

Example 14

| Material | Weight % |
| --- | --- |
| Natural Peanut Butter (Coarse) | 97.0 |
| Double Distilled Candelilla Wax | 3.0 |

Example 15

| Material | Weight % |
| --- | --- |
| Natural Peanut Butter (Fine) | 100.0 |
| Wax | 0.0 |

Example 16

| Material | Weight % |
| --- | --- |
| Natural Peanut Butter (Fine) | 99.25 |
| Rice Bran Wax | 0.75 |

Example 17

| Material | Weight % |
| --- | --- |
| Natural Peanut Butter (Fine) | 99.0 |
| Candelilla Wax | 1.0 |

Texture Analysis

A TA.XT Plus instrument (texture Technologies located in Scarsdale, N.Y.) was equipped with a 3" long, ⅜" radius rounded-end stainless steel probe, which is an adaptation of a TA-23 probe. The probe was then inserted into each centrifuge tube containing the sample of peanut butter-wax-stabilizer mixture at a pre- and post-test speed of 1.5 mm/is through a distance of 30 mm. The probe was then retracted to the starting position. Testing for each of the samples was run in triplicate. The force values at 30 mm were recorded and are shown below in Table 1.

In general, back extrusion is a technique whereby a cylindrical probe/rod is used to test the mechanical properties of a sample in a cylindrical shaped holder. Back extrusion can be used to test samples that are very soft and liquid like to samples that are very hard and brittle. As the probe is inserted into a sample, the product will be extruded backwards. This type of measurement allows for the estimation of the relative hardness associated with each sample, which is the penetration force at a respective value measured in millimeters, as well as the energy required to spread/extrude the product by measuring the area under the curve.

TABLE 1

| Sample | Force (g) at 30 mm |
| --- | --- |
| Example 1 | 167 |
| Example 2 | 927 |
| Example 3 | 909 |
| Example 4 | 1084 |
| Example 5 | 1392 |
| Example 6 | 2093 |
| Example 7 | 2426 |
| Example 8 | 3728 |
| Example 9 | 434 |
| Example 10 | 918 |
| Example 11 | 1584 |
| Example 12 | 670 |
| Example 13 | 1367 |
| Example 14 | 2326 |
| Example 15 | 70 |
| Example 16 | 779 |
| Example 17 | 278 |

Oil Release/Loss

Each sample was tested in order to determine the percent of oil loss for each sample. In order to measure the amount of oil released from each sample, two empty Whatman #1 filter papers were weighed-out and a 5 gram portion of each sample was placed between the two filter papers in a sandwiched configuration. A two kilogram weight was centrally placed on top of each sandwiched sample for about 5 seconds in order to apply pressure to the sample in a consistent reproducible manner. Each sample was allowed to remain in this arrangement for 24 hours at a temperature between about 68° F. and 72° F. After this period of time, the two filter papers were re-weighed and the amount of oil released from the sample into the two filter papers was then determined by gravimetric analysis. To correct for any effects due to ambient humidity, a control set of empty filter papers, exposed to the same environment as the test sample (a temperature between about 68° F. and 72° F. for 24 hours), were also measured and these values were used in the gravimetric analysis to adjust for any changes in the filter paper weight due to moisture pick up. The results of the gravimetric analysis are provided below in Table 2.

TABLE 2

| Sample | % Oil Loss |
| --- | --- |
| Example 1 | 16.4 |
| Example 2 | 10.7 |
| Example 4 | 11.1 |
| Example 5 | 10.2 |
| Example 6 | 9.2 |
| Example 8 | 6.0 |
| Example 9 | 12.5 |
| Example 12 | 15.2 |
| Example 13 | 12.3 |
| Example 14 | 6.8 |
| Example 15 | 19.0 |

A review of the data shown in Tables 1 and 2 reveals several surprising results. The data surprisingly demonstrates that the plant-derived waxes, when used at the same level in both coarse and fine ground peanut butter, are more effective in contributing to the measured hardness of coarse ground peanut butter as compared to the measured hardness of fine ground peanut butter (see comparative Examples 4 and 16, as well as, Examples 9 and 17). Also, when the performance of rice bran wax was compared to the performance of the commercial stabilizer, when rice bran wax and commercial stabilizer are used at similar levels in the coarse ground peanut butter, an increase of approximately 50.2% in hardness was observed for those compositions containing the rice bran wax (see Examples 2 and 5). Double distilled candelilla wax is also contemplated as a potentially suitable stabilizer for use with coarse ground peanut batter. However, it may be preferable to increase the loading of this wax to about 2 wt. % of the overall composition (compare Examples 5 and 13). In general this leads to the conclusion that using larger nut particles (from coarse ground peanut butter), in combination with a plant-derived wax, unexpectedly results in an increase in hardness of the associated samples as compared to hardness achieved when a commercial stabilizer is used instead.

Furthermore, a review of the data also shows that combining coarse ground peanut butter with differing levels of plant-derived waxes results in differing reductions in oil loss. Without intending to be bound by theory, with regard to compositions that contain coarse ground peanut butter, it appears there is some relationship between the amount of plant-derived wax that is used in a sample and the measured oil loss associated with that sample (see comparative Examples 4-6 and Examples 12-14). For example, the data reveals that at a similar 1 wt. % loading in the coarse ground peanut butter, rice bran wax is about 22.5% more effective in reducing oil loss as compared to candelilla wax, and is about 49.0% more effective in reducing oil loss as compared to double distilled candelilla wax (see Examples 5, 9, and 12). In general, this leads to a conclusion that plant-derived wax stabilizers like rice bran wax exhibit enhanced ability to reduce oil loss from peanut butter when the peanut butter contains larger nut particle sizes (e.g. coarse ground peanut butter).

Based upon the foregoing disclosure, it should now be apparent that the stabilized butter compositions as described herein will carry out the objects set forth hereinabove. It is, therefore, to be understood that any variations evident fall within the scope of the claimed invention and thus, the selection of specific component elements can be determined without departing from the spirit of the invention herein disclosed and described.

What is claimed is:

1. A butter composition comprising:
   at least one type of a roasted and ground nut, seed or legume; and
   a stabilizer, wherein the stabilizer is a plant wax selected from the group consisting essentially of rice bran wax, sunflower wax and mixtures thereof, and wherein the plant wax has an ester content in the range from 92%-100%.

2. The composition of claim 1, wherein the at least one type of roasted and ground nut, seed or legume is selected from the group consisting of peanuts, almonds, pecans, walnuts, cashews, macadamia nuts, hazelnuts, Brazilian nuts, sunflower seeds, sesame seeds, pumpkin seeds and mixtures thereof.

3. The composition of claim 1, wherein the plant wax has a melting point in the range from about 74° C.-82° C.

4. The composition of claim 1, wherein the composition includes about 0.2-5.0 wt. % of the plant wax.

5. The composition of claim 4, wherein the composition includes about 0.5-2.0 wt. % of the plant wax.

6. The composition of claim 1, wherein the composition further comprises at least one sweetener and salt.

7. The composition of claim 6, wherein the sweetener is selected from the group consisting of sugar, high fructose corn syrup, honey, molasses and mixtures thereof.

8. A method of preparing a stabilized butter composition, the method comprising the steps of:
   roasting at least one variety of a nut, seed or legume;
   grinding the at least one variety of nut, seed or legume to form a nut paste, seed paste or legume paste;
   heating a stabilizer above its melting point to form a pourable stabilizer, wherein the stabilizer is a plant wax selected from the group consisting essentially of rice bran wax, sunflower wax and mixtures thereof, and wherein the plant wax has an ester content in the range from 92%-100%;
   mixing the pourable stabilizer with the nut paste, seed paste or legume paste to form a mixture; and
   cooling the mixture to form the stabilized butter composition.

9. The method of claim 8, wherein the at least one variety of nut, seed or legume is selected from the group consisting of peanuts, almonds, pecans, walnuts, cashews, macadamia nuts, hazelnuts, Brazilian nuts, sunflower seeds, sesame seeds, and pumpkin seeds.

10. The method of claim 8, wherein the plant wax has an ester content in the range from about 78%-100%.

11. The method of claim 8, wherein the pourable stabilizer is mixed with the nut paste in an amount such that the stabilized butter composition includes about 0.2-5.0 wt. % of the plant wax.

12. The method of claim 11, wherein the stabilized butter composition includes about 0.5-2.0 wt. % of the plant wax.

13. The method of claim 8, wherein the further comprises adding salt and at least one sweetener to the mixture.

14. The method of claim 13, wherein the sweetener is selected from the group consisting of sugar, high fructose corn syrup, honey, and molasses.

15. A butter stabilizer composition comprising a plant wax selected from the group consisting essentially of rice bran wax, sunflower wax and mixtures thereof, having an ester content in the range from about 92%-100% and a melting point in the range from about 74° C.-82° C.

* * * * *

UNITED STATES PATENT AND TRADEMARK OFFICE
CERTIFICATE OF CORRECTION

PATENT NO. : 9,554,591 B2
APPLICATION NO. : 14/700457
DATED : January 31, 2017
INVENTOR(S) : Marangoni et al.

Page 1 of 1

It is certified that error appears in the above-identified patent and that said Letters Patent is hereby corrected as shown below:

In the Claims

In Column 10, Line 46 (Claim 13, Line 1), after "wherein the", insert --method--.

Signed and Sealed this
Twenty-first Day of March, 2017

Michelle K. Lee
*Director of the United States Patent and Trademark Office*